(12) United States Patent
Higuchi et al.

(10) Patent No.: US 7,957,405 B2
(45) Date of Patent: *Jun. 7, 2011

(54) PACKET COMMUNICATION METHOD AND APPARATUS AND A RECORDING MEDIUM STORING A PACKET COMMUNICATION PROGRAM

(75) Inventors: Hidemitsu Higuchi, Yokohama (JP); Toshikazu Yasue, Chigasaki (JP); Ken Watanabe, Kawasaki (JP); Kazuaki Tsuchiya, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/714,742

(22) Filed: Mar. 1, 2010

(65) Prior Publication Data

US 2010/0158012 A1 Jun. 24, 2010

Related U.S. Application Data (63) Continuation of application No. 11/976,639, filed on Oct. 26, 2007, now Pat. No. 7,701,952, which is a continuation of application No. 10/207,247, filed on Jul. 30, 2002, now Pat. No. 7,385,989, which is a continuation of application No. 09/257,003, filed on Feb. 25, 1999, now Pat. No. 6,580,717, which is a continuation-in-part of application No. 08/887,123, filed on Jul. 2, 1997, now Pat. No. 6,038,233.

(30) Foreign Application Priority Data

Jul. 4, 1996 (JP) .................................... 8-174768
Feb. 27, 1998 (JP) .................................. 10-046739

(51) Int. Cl.
*H04L 12/28* (2006.01)

(52) U.S. Cl. ...................................... 370/401; 370/466

(58) Field of Classification Search .. 370/395.5–395.54, 370/465–466
See application file for complete search history.

(56) References Cited

U.S. PATENT DOCUMENTS

| 5,793,763 | A | 8/1998 | Mayes et al. |
| 5,802,285 | A | 9/1998 | Hirviniemi |
| 6,038,233 | A | 3/2000 | Hamamoto et al. |
| 6,118,784 | A | 9/2000 | Tsuchiya et al. |
| 7,158,526 | B2 * | 1/2007 | Higuchi et al. ............... 370/401 |

OTHER PUBLICATIONS

RFC 1933, Transmition Mechanism for IPv̂ and Routers, R. Gilligan, Apr. 1998, IETF.
Clark et al., Protocol discovery in multiprotocol networks, Baltzer Science Publishers BV, pp. 271-284, 1997.

(Continued)

*Primary Examiner* — Frank Duong
(74) *Attorney, Agent, or Firm* — Mattingly & Malur, PC (57) ABSTRACT

A packet communication method and a packet communication system capable of making an IPv4-compatible application operating on an information processing apparatus communicate with another information processing apparatus connected to an IPv6 network without using an address translation router. In the information processing apparatus connected to the IPv6 network, an IPv4-to-IPv6 protocol conversion control function is incorporated in a LAN driver. A protocol conversion control module receives an IPv4 packet from a protocol control module. When a send destination IPv4 address contained in a header of the packet is registered in an address translation table incorporated in the protocol conversion control module, an IPv6 address is generated to be sent onto a LAN. Unless the send destination IPv4 address contained in the packet header is registered in the address translation table incorporated in the protocol conversion control module, the IPv4 packet as received is intactly sent onto the LAN.

10 Claims, 11 Drawing Sheets

OTHER PUBLICATIONS

DARPA Internet Program, Internet Protocol, RFC 791, pp. 1-34, Sep. 1981.

Egevang et al., The IP Network Address Translator (NAT), RFC 1631, pp. 1-8, May 1994.

Haskin et al., Routing Aspects of IPv6 Transition, Internet Draft, pp. 1-13, Nov. 1994.

Tsuchiya et al., A Communication Mechanism between IPv4 and IPv6, Internet Draft, pp. 1-9, Nov. 1997.

Tsuchiya et al., Dual Stack Hosts using teh "Bump-in-the-Stack" Technique, Internet Draft, pp. 1-11, Nov. 1998.

Nordmark, Stateless IP/ICMP Translator (SIIT), Internet Draft, pp. 1-23, Jan. 1999.

Jinzaki et al., SOCKS64: An IPv4-IPv6 interconnection gateway using SOCKS5 protocol, Internet Draft, pp. 1-7, Nov. 1998.

Kitamura, A SOCKS-based IPv6-IPv4 Translator Architecture, Internet Draft, pp. 1-11, Nov. 1998.

* cited by examiner

| IPv6 ADDRESS | IPv4 ADDRESS |
|---|---|
| IPv6-A | IPv4-A |
| IPv6-B | IPv4-B(PRIVATE) |
| IPv6-C | IPv4-C(PRIVATE) |

| IPv6 ADDRESS | IPv4 ADDRESS |
|---|---|
| IPv6-B | IPv4-B |
| IPv6-C | IPv4-C(PRIVATE) |
| IPv6-A | IPv4-A(PRIVATE) |

PACKET COMMUNICATION METHOD AND APPARATUS AND A RECORDING MEDIUM STORING A PACKET COMMUNICATION PROGRAM

CROSS REFERENCES TO RELATED APPLICATIONS

This application is a continuation application of U.S. patent application Ser. No. 11/976,639, filed Oct. 26, 2007, now pending, which is a continuation application of U.S. patent application Ser. No. 10/207,247, filed Jul. 30, 2002, now U.S. Pat. No. 7,385,989, which is a continuation application of U.S. patent application Ser. No. 09/257,003, filed Feb. 25, 1999, now U.S. Pat. No. 6,580,717, which is a continuation-in-part application of U.S. patent application Ser. No. 08/887,123, filed Jul. 2, 1997, now U.S. Pat. No. 6,038,233, which claims priority to Japanese Pat. Appl. Nos. 10-046739, filed Feb. 27, 1998 and 08-174768, filed Jul. 4, 1996, the entire disclosures of which are incorporated herein by reference. This application is related to U.S. patent application Ser. No. 10/453,589, filed Jun. 4, 2004, now U.S. Pat. No. 7,158,526.

BACKGROUND OF THE INVENTION

1. Field of the Invention

The present invention relates to a method of operating IPv4-network-compatible applications on an IPv6 network, a packet generation method, an IP-network-dedicated translator and an NAT (Network Address Translator) as well as a recording medium having a packet generation program recorded thereon.

2. Description of Related Art

Among the protocols for the network layers employed in the TCP (Transmission Control Protocol)/IP (Internet Protocol) communications, the one most familiar in the present state of the art is the IP. At present, the IP of version 4 (hereinafter referred to as the IPv4) is prevailing. Although the IP is currently winning popularity more and more at a high rate in various communication service fields, keeping step with spreading of the internet, the IP nevertheless confronts a serious problem in respect to the exhaustion of IP address.

As measures for solving the above problem, there are proposed currently such a provisional solution that private address space of the IPv4 is locally provided for local LANs (Local Area Networks) as well as an IP of version 6 (hereinafter referred to as the IPv6). In the present state of the art, a large scale LAN is being realized in which there coexist mixedly the LANs conforming to the IPv6 and the LANs conforming to the IPv4, respectively. As a document concerning the standards for the interconnection of the IPv6-based LAN and the IPv4-based LAN, there can be mentioned "RFC1933". According to the RFC1933 (Transition Mechanism for IPv6 and Routers; R. Gilligan, 1996, April, IETF), interconnection of the IPv6 network is rendered possible by mapping the IPv4 address to the IPv6 address.

SUMMARY OF THE INVENTION

As mentioned above, although the IPv6 network is on the way of being developed, the number of the APs (Application Programs) conforming to or compatible with the IPv6 is very small as compared with the IPv4-compatible APs. It is further noted that there has not yet been available such means which allows the IPv4-compatible application operating on a PC (Personal Computer)/WS (Work Station) and the IPv6-compatible application on a PC/WS to communicate directly with each other without resorting to the aid of a network having an NAT function such as the address translation router or the like. In the case where the address translation router is employed, protocol conversion is performed in addition to the routing processing known heretofore. Thus, a heavy load is imposed on the address translation router. By the way, the IPv4 packet dedicated to the hardware address resolution undergoes no conversion. In order that an existing IPv4-compatible AP can perform communication without consciousness of the IP address of a connection-destined host, a logical-name-based address resolution relying on a DNS (Domain Name System) is indispensably required.

With the present invention, it is contemplated as an object thereof to make it possible that an IPv4-compatible APs operating on a PC/WS can communicate directly with an IPv6-compatible application on a host such as a PC/WS or the like without need for intervention of network equipment such as the address translation router or the like imparted with the NAT function.

Another object of the present invention is to provide a DNS function conforming to or compatible with the IPv6 (IPv6 address inquiry function) in order to make it possible for an IPv4-compatible AP to perform communication without consciousness of the address of a communication counterpart.

Yet another object of the present invention is to make it possible that a packet for hardware address resolution conforming to or compatible with the IPv4 as issued by an existing AP can be converted to a hardware-address-resolution-dedicated packet conforming to or compatible with the IPv6 with a view to enabling an IPv4-compatible AP to communicate with an IPv6-compatible AP.

The information processing apparatus such as PC/WS or the like which is imparted with a LAN control function (hereinafter also referred to as the LAN control apparatus) and to which the present invention can find application includes ordinarily IPv4-compatible APs and an IPv4 protocol control module. Ordinarily, the above-mentioned LAN control function is realized mainly through a program, so-called software, and there is additionally provided hardware destined for performing transmission/reception controls for the communication media.

For achieving the objects mentioned above, a protocol conversion control module is provided between an IPv4 protocol control module and a LAN control module both for the LAN control function. The protocol conversion control module includes an IPv4-IPv6 switch control module, a buffer conversion module, a header conversion control module, an IPv6 transmission/reception control module and a DNS-NAT cooperation or cooperation control module. The protocol conversion control module converts the IPv4 packet outputted from the IPv4 protocol control module to the IPv6 packet and outputs the latter to the LAN control module. Further, the IPv6 packet outputted from the LAN control module is converted to the IPv4 packet to be subsequently outputted to the IPv4 protocol control module.

Controls and data flows among the individual control modules are as follows.

In the case of transmission, data is transferred from an IPv4-compatible AP to the IPv4 protocol control module, while the IPv4 protocol conversion control module transfers the IPv4 packet to the protocol conversion control module. The protocol conversion control module interprets the packet as transferred, to thereby perform processings described below. In the case of an ARP request packet, the protocol conversion control module messages a hardware address as generated to the IPv4 protocol control module. In that case, the actual hardware address resolution is realized by performing address resolution with the IPv6 protocol.

In the case of inquiry packet of the DNS, the protocol conversion control module inquires both the IPv6 address and the IPv4 address, and when the IPv6 address is returned as a response packet, the IPv4 address which corresponds to the IPv6 address is transmitted to the IPv4 protocol control module.

In the case of an ordinary packet, the protocol conversion control module checks the IPv4 address of a send destination as contained in the IPv4 header to thereby perform processings mentioned below. When the above address is one registered in an address translation table incorporated in the protocol conversion control module, the protocol conversion control module translates the address of concern to the IPv6 address on the basis of the address translation table to thereby generate an IPv6 header, which is then sent onto the LAN in the form of IPv6 packet. Unless the address of concern is registered in the address translation table incorporated in the protocol conversion control module, the protocol conversion control module sends the IPv4 packet intactly onto the LAN.

In the case of reception, when an IPv6 packet is received from the LAN control module, the protocol conversion control module checks the IPv6 address of the source sender as contained in the IPv6 header. When the address mentioned above is one registered in the address translation table incorporated in the protocol conversion control module, the protocol conversion control module translates that address to the corresponding IPv4 address to thereby generate an IPv4 header and transfer the IPv4 packet data to the IPv4 protocol control module of higher level.

In the case where the IPv6 address is not registered in the address translation table incorporated in the protocol conversion control module, the protocol conversion control module discards the received packet. Upon reception of the IPv4 packet from the LAN control module, the protocol conversion control module transfers the data of the other packet than the DNS response packet to the protocol control module. In this manner, it is possible to make the IPv4-compatible AP communicate with the IPv6-compatible AP.

By adopting the means described above, the objects mentioned previously can be achieved.

Thus, by providing the protocol conversion control module between the protocol control module and the LAN control module known heretofore so that the protocol conversion control module performs header conversion between the IPv4 header and the IPv6 header for the packets flowing between the protocol control module and the LAN control module, the application program which transfers data to the protocol control module can carry out the communication with other apparatus connected to the IPv6 network in accordance with the IPv6, even when the former is the IPv4-compatible application.

DETAILED DESCRIPTION OF THE EMBODIMENTS

Exemplary embodiments of the present invention will be described by reference to the drawings.

At first, description will be made of an exemplary network configuration according to an embodiment of the present invention.

Figure 2:
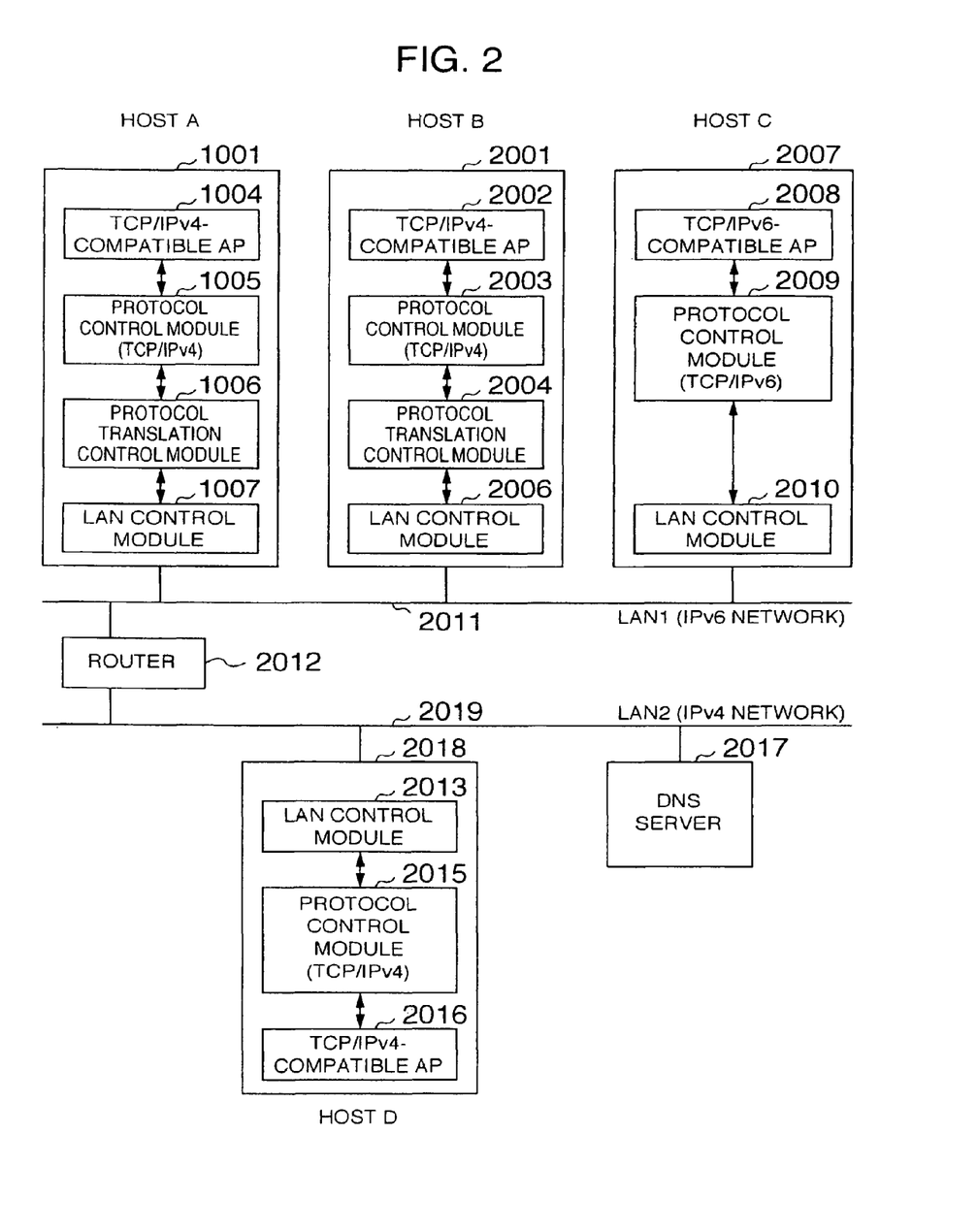
FIG. 2 shows an exemplary configuration of a communication network system according to an exemplary embodiment of the present invention.

FIG. 2 is a view showing an exemplary network configuration according to the instant embodiment. As can be seen in the figure, hosts each implemented as an information processing apparatus having a LAN control function (hereinafter also referred to as the LAN control apparatus) are interconnected to constitute networks. An IPv6 network 2011 and an IPv4 network 2019 are interconnected via an IPv4-to-IPv6 translation router 2012. Connected to the IPv4 network 2019 is a DNS (Domain Name System) server 2017 which is in charge of managing domain names of the IPv4 network 2018 and the IPv6 network 2011. Further connected to the IPv4 network 2018 is a host D 2018 which is compatible with or conforms to an existing IPv4 such as a PC or the like.

Connected to the IPv6 network 2011 are a host A 1001, a host B 2001 and a host C 2007. Each of the host A 1001 and the host B 2001 is realized as the host having an IPv4-to-IPv6 translation function. The host C 2007 serves as the IPv6-dedicated host, and an IPv6-compatible AP is operating on the host C 2007. Incorporated in the hosts A and B, respectively, are IPv4-compatible APs 1004 and 2002, protocol control modules 1005 and 2003, protocol conversion control modules 1006 and 2004 and LAN control modules 1007 and 2006.

Firstly, description will be directed to the interfaces between or among the individual control modules incorporated in the host A 1001. The interface between the TCP/IPv4-compatible AP 1004 and the interface protocol control module 1005 serves as the interface for transaction of user data.

Communication between the protocol control module 1005 and the protocol conversion control module 1006 is performed by using IPv4 packets. The IPv4 packet is comprised of an MAC (Media Access control) header field, an IPv4 header field and an IPv4 packet data field. Communication between the protocol conversion control module 1006 and the LAN control module 1007 is realized by using the IPv6 packet and IPv4 packet.

The IPv6 packet is comprised of an MAC header field, an IPv6 header field and an IPv6 packet data field. The protocol conversion control module 1006 checks the IPv4 header of the IPv4 packet inputted from the protocol control module 1005 to thereby decide whether or not header conversion is to be performed. When the conversion is required, the IPv4 header is converted to an IPv6 header, whereupon the IPv6 packet resulting from the conversion is outputted to the LAN control module.

Next, description will be made of the addresses set at the hosts A to D. In this conjunction, the IPv4 address held by the protocol control module 1005 of the host A 1001 is represented by IPv4-A, the IPv4 address held by the protocol control module 2003 of the host B 2001 is represented by IPv4-B, and the IPv4 address held by the protocol control module 2015 of the host D 2018 is represented by IPv4-D.

Figure 3:
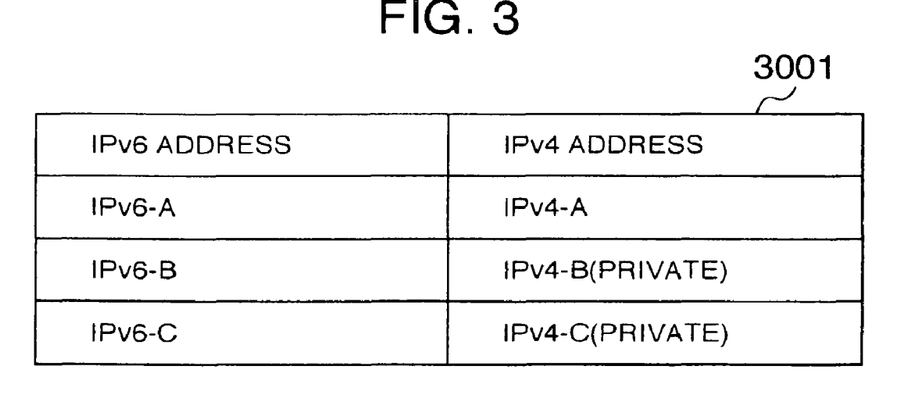
FIG. 3 illustrates an exemplary structure of an address translation table of a host A according to an exemplary embodiment of the present invention.

An exemplary structure of an address translation table of the host A 1001 is illustrated in FIG. 3. The IPv6 address IPv6-A corresponds to the IPv4 address IPv4-A of the host A 1001, the private IPv4 address IPv4-B (private) corresponds to the IPv6 address IPv6-B of the host B 2001, and the private IPv4 address IPv4-C (private) corresponds to the IPv6 address IPv6-C of the host C 2007.

Figure 4:
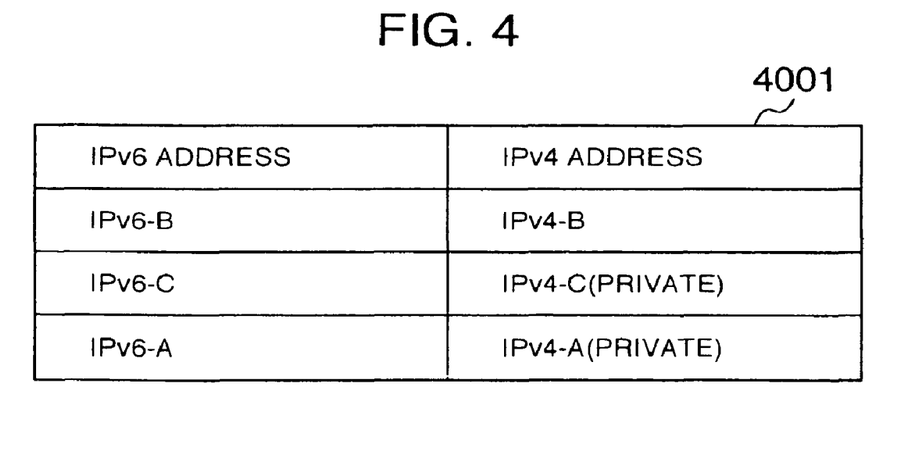
FIG. 4 illustrates a structure of an address translation table of a host B according to an exemplary embodiment of the present invention.

An exemplary structure of an address translation table of the host B is illustrated in FIG. 4. The IPv6 address IPv6-B corresponds to the IPv4 address IPv4-B of the host B 2001, the private IPv4 address IPv4-C (private) corresponds to the IPv6 address IPv6-C of the host C 2007, and the private IPv4 address IPv4-A (private) corresponds to the IPv6 address IPv6-A of the host A 1001.

The first entry of the address translation table (hereinafter also referred to as the NAT table) which indicates correspondence between the own IPv4 address and the IPv6 address is set upon initialization. The second and subsequent entries are set statically by the user or set dynamically by the DNS-NAT cooperation control module incorporated in the protocol conversion control module.

Next, communications between the host A 1001 and the host B 2001, between the host A 1001 and the host C 2007, and between the host A 1001 and the host D 2018, respectively, will be explained by reference to FIG. 3 and FIG. 4.

At first, communication between the host A 1001 and the host B 2001 will be described. The IPv4-compatible AP 1004 of the host A 1001 sends IPv4 packet by using a provisional IPv4 address IPv4-B (private) for the host B 2001 via the protocol control module 1005. When the send destination IPv4 address contained in the IPv4 header is registered in the address translation table 3001, the corresponding IPv6 address is read out from the address translation table 3001 to thereby generate the IPv6 header, whereon the IPv6 packet is sent onto the LAN 1 (2011) under the control of the LAN control module 1007.

Upon reception of the IPv6 packet, the LAN control module 2006 of the host B 2001 transfers the packet to the protocol conversion control module 2004. The protocol conversion control module 2004 checks the send destination IPv6 address contained in the IPv6 header. When the send destination IPv6 address is registered in the address translation table 4001, the corresponding IPv4 address is read out from the address translation table 4001 to thereby generate an IPv4 header, whereon the IPv4 packet is transferred to the protocol control module 2003.

Next, description will turn to communication between the host A 1001 and the host C 2007. In the host A 1001, the IPv6 packet is generated for the provisional IPv4 address of the host C 2007 by referencing the address translation table 3001 as in the case of the communication to the host B 2001, which packet is then received intactly by the host C 2007 to be interpreted by the protocol control module 2009.

Description will next be made of the communication between the host A 1001 and the host D 2018. The IPv4-compatible AP 1004 of the host A 1001 sends the IPv4 packet via the protocol control module 1005 by using the IPv4 address IPv4-D for the host D 2018. The protocol conversion control module 1006 checks the send destination IPv4 address contained in the IPv4 header. The IPv4 packet is sent out via the LAN control module 1007 without undergoing the header conversion because the IPv4-D is not registered in the address translation table 3001. The IPv4 packet as sent out is received by the router 2012, whereupon the IPv4 packet as received by the router 2012 is sent out onto the LAN 2 2019. Thus, the host D 2013 connected to the LAN 2 2019 receives the IPv4 packet, whereon the IPv4-compatible AP 2016 receives the data sent from the IPv4-compatible AP 1004 of the host A 1001 by way of the LAN control module 2013 and the protocol control module 2015.

Figure 1:
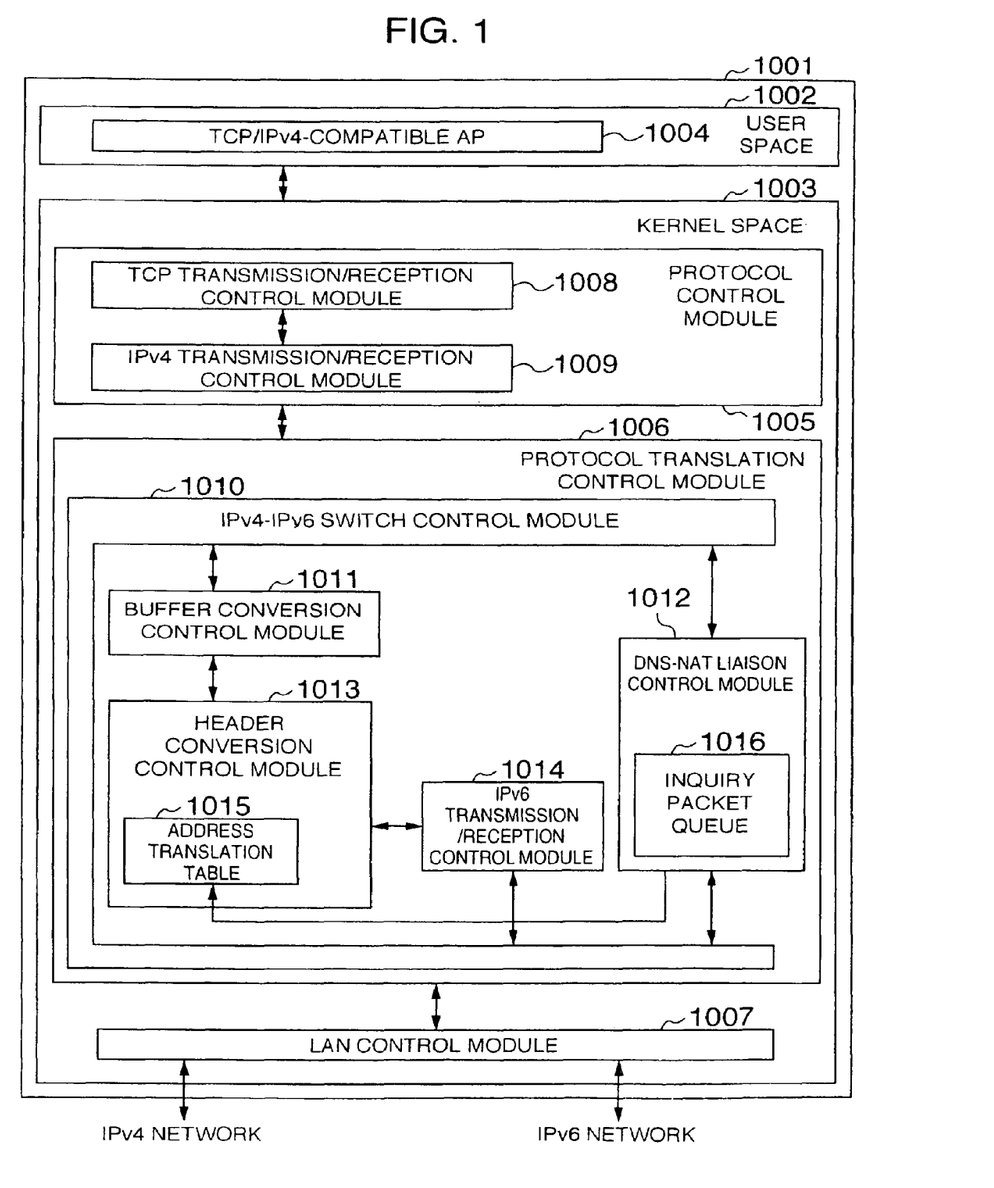
FIG. 1 is a configuration diagram of a LAN control apparatus according to a first embodiment of the present invention.

Now referring to FIG. 1, configuration of the LAN control apparatus of the host A, host B and others will be described. FIG. 1 shows a configuration of the LAN control apparatus 1001 of the host A. The address space of the LAN control apparatus 1001 is comprised of a user space 1002 in which application programs operate and a kernel space 1003 in which the kernel operates. A TCP/IPv4-compatible AP 1004 is resident in the user space 1002. As the AP, there can be mentioned TCP/IPv4-compatible programs such as telnet, ftp, HTTP client and others.

Interfacing between the TCP/IPv4-compatible AP 1004 resident within the user space 1002 and the protocol control module 1005 resident within the kernel space 1003 is realized by inputting/outputting the data packets generated by the TCP/IPv4-compatible AP 1004.

The kernel space 1003 includes individual components such as the protocol control module 1005, the protocol conversion control module 1006 and the LAN control module 1007.

Interfacing between the protocol control module 1005 and the protocol conversion control module 1006 is realized by the interface through which the IPv4 packets are inputted/outputted. The IPv4 packet is a packet constituted by adding an IPv4 header and an MAC (Media Access Control) header to a data packet. Interfacing between the protocol conversion control module 1006 and the LAN control module 1007 is realized by an interface through which the IPv4 packets or the IPv6 packets are inputted/outputted. The IPv6 packet is a packet constituted by an IPv6 header and the MAC header added to a data packet.

The protocol control module 1005 includes a TCP transmission/reception control module 1008 and an IPv4 transmission/reception control module 1009.

The protocol conversion control module 1006 includes an IPv4-IPv6 switch control module 1010, a buffer conversion control module 1011, a DNS-NAT cooperation control module 1012, a header conversion control module 1013, an IPv6 transmission/reception control module 1014, an address translation table 1015 and an inquiry packet queue 1016.

Next, description will be directed to individual control modules incorporated in the protocol conversion control module 1006.

Firstly, description will be directed to the input/output interface between the individual control modules. All the communications performed between the individual control modules incorporated in the protocol conversion control module 1006 are realized by inputting/outputting IPv4 packets or IPv6 packets.

The IPv4-IPv6 switch control module 1010 has a packet switching function for the IPv4 packet transferred from the protocol control module 1005 and the received packet transferred from the LAN control module 1007 (IPv4 packet or IPv6 packet), and a hardware address dummy response processing function for the protocol control module 1005. Contents of this processing will be described in detail hereinafter.

The buffer conversion control module 1011 controls conversion of a buffer handled by the protocol control module 1005 and a buffer handled by the protocol conversion control module 1006. The IPv6 transmission/reception control module 1014 performs IPv6 protocol processing.

The header conversion control module 1013 performs conversion between the IPv4 header and the IPv6 header by referencing the address translation table 1015. The DNS-NAT cooperation control module 1012 copies the DNS address inquiry packet received from the protocol control module 1005, to thereby inquire of both the IPv4 address and the IPv6 address. Further, the DNS-NAT cooperation control module 1012 reserves the address of the IPv4 (ordinarily private address) and allocates the reserved IPv4 address to the IPv6 address of the connection-destined host (provisional IPv4 address) to register it in the address translation control table 1015 incorporated in the header conversion control module 1013. The provisional IPv4 address registered in the DNS-NAT cooperation control module 1012 is transmitted to the protocol control module 1005 to thereby allow the TCP/IPv4-compatible AP 1004 to be connected to the IPv6 network by using the provisional IPv4 address, starting from the most significant one.

An inquiry packet queue 1016 is resident internally of the DNS-NAT cooperation control module 1012. The inquiry packet queue is a table which registers therein in combination the DNS inquiry packet information outputted from the protocol conversion control module 1005 and the information concerning the processing for the inquiry packet mentioned above (i.e., flag indicating whether DNS response packet processing has been done in response to the DNS inquiry packet). By using this inquiry packet queue, the address inquiry packet is queued for performing the reception control of the response packet for the address inquiry packet. Concerning the contents of the processing performed by the DNS-NAT cooperation control module 1012, description will be made in detail hereinafter.

Figure 7:
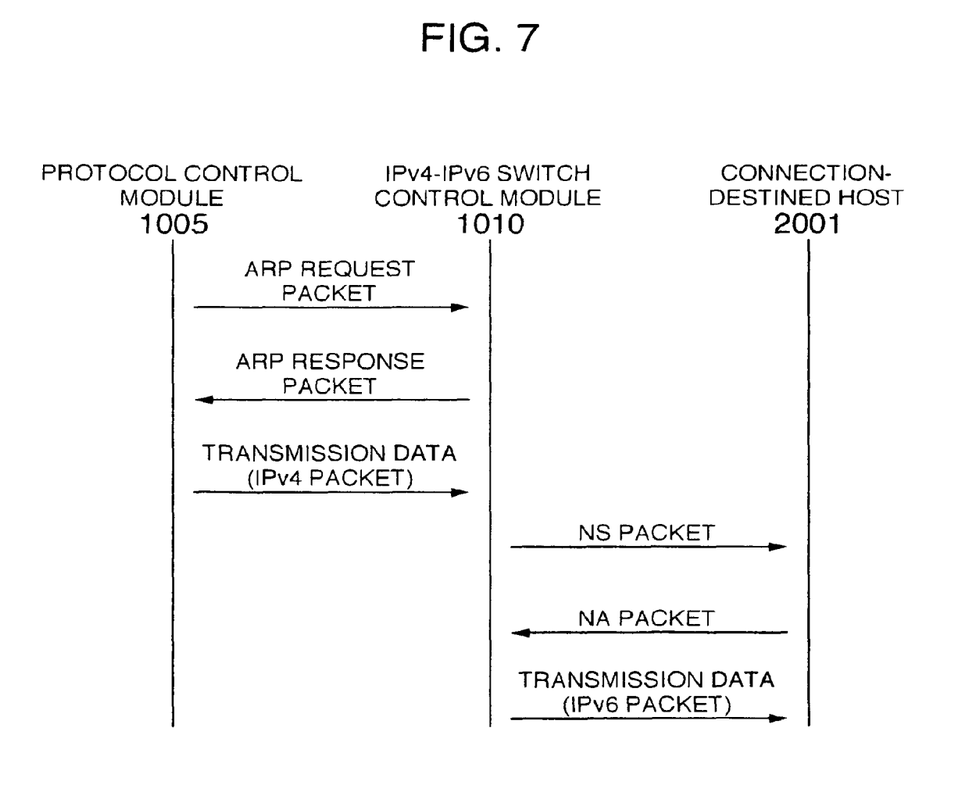
FIG. 7 illustrates a packet sequence involved in a MAC address resolution.

The hardware address dummy processing function of the IPv4-IPv6 switch control module 1010 will be elucidated by reference to FIG. 7.

FIG. 7 is a view illustrating a packet sequence involved in the MAC address resolution between the protocol control module 1005 and the IPv4-IPv6 switch control module 1010 incorporated in the LAN control apparatus 1001 and the connection-destined host 2001.

Between the protocol control module 1005 and the IPv4-IPv6 switch control module 1010, the IPv4 packets are inputted/outputted, while between the IPv4-IPv6 switch control module 1010 and the connection-destined host 2001, IPv6 packets are transferred as input/output by way of the LAN.

At first, for the purpose of the hardware address resolution for the connection-destined host 2001, the protocol control module 1005 outputs the ARP request packet to the IPv4-IPv6 switch control module 1010.

The IPv4-IPv6 switch control module 1010 then generates an ARP response message which is then outputted to the protocol control module 1005. For the send source hardware address contained in the ARP response message, the IPv4-IPv6 switch control module 1010 generates and sets a given address. The protocol control module 1005 generates an MAC header by using this hardware address, wherein the IPv4 packet is outputted to the IPv4-IPv6 switch control module 1010. The IPv4-IPv6 switch control module 1010 converts the IPv4 packet to the IPv6 packet through the medium of the header conversion control module 1013. In that case, hardware address information of the connection-destined host 2001 is required for generating the MAC header. To this end, the data inputted from the protocol control module 1005 and converted to the IPv6 packet is temporarily held in the IPv4-IPv6 switch control module 1010, and an NS (Neighbor Solicitation) package is generated for inquiring about the hardware address of the connection-destined host 2001.

The IPv4-IPv6 switch control module 1010 outputs this NS packet (IPv6 packet) to the connection-destined host 2001 via the LAN. Upon reception of the NS packet, the connection-destined host 2001 generates an NA (Neighbor Advertisement) packet for messaging the own hardware address, the NA packet as generated being then outputted to the IPv4-IPv6 switch control module 1010 of the LAN control apparatus 1001 via the LAN. Upon reception of the NA packet, the IPv4-IPv6 switch control module 1010 generates the MAC header on the basis of the hardware address information concerning the connection-destined host 2001 as contained in the NA packet, to thereby generate the IPv6 packet which is then outputted to the connection-destined host 2001 via the LAN together with the IPv6 packet data being held.

Figure 15:
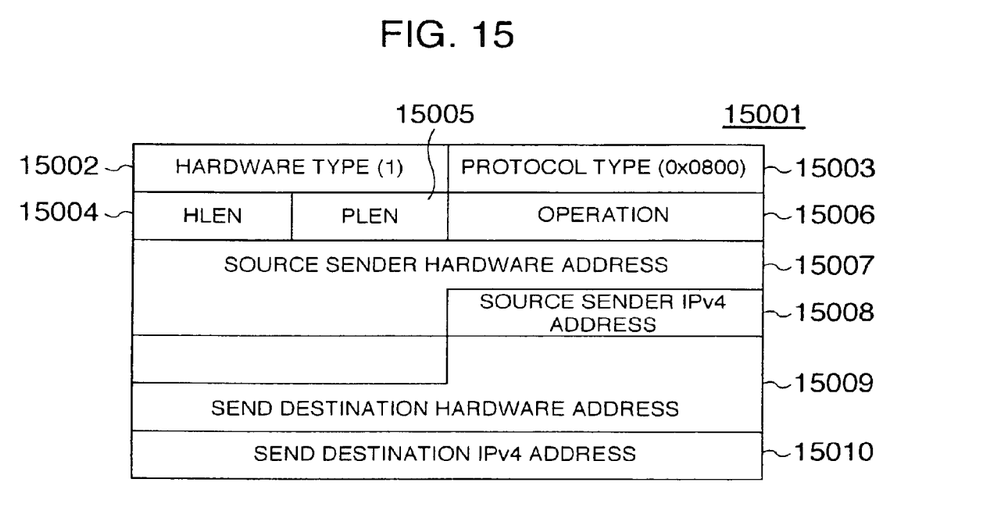
FIG. 15 is a view showing a format of an ARP message.
Figure 16:
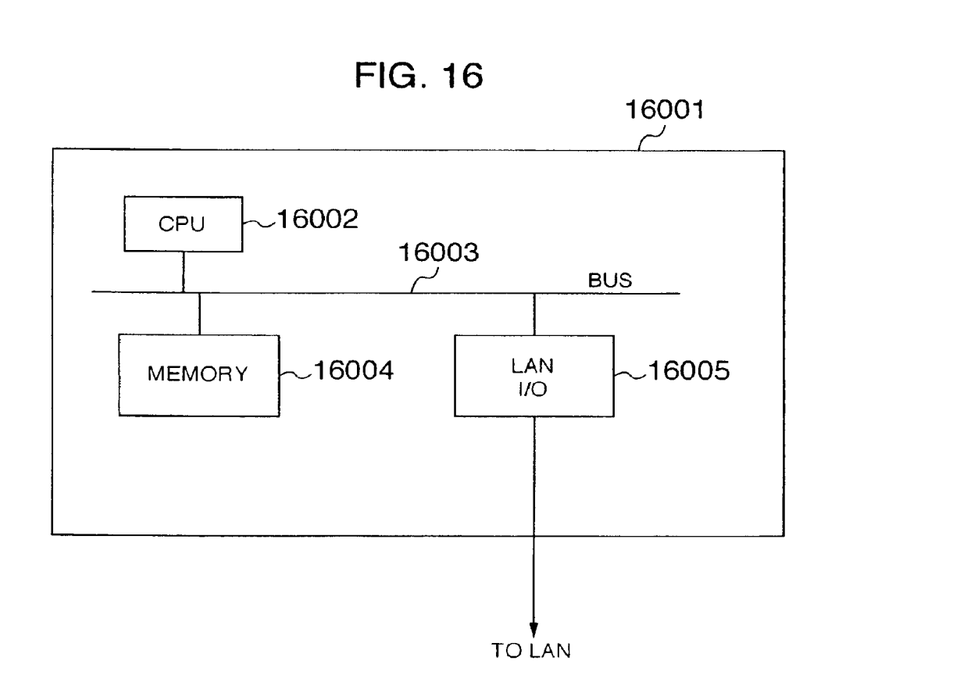
FIG. 16 is a configuration diagram of an information processing apparatus.

A format of the ARP message data is shown in FIG. 15. A hardware type field of the ARP message indicates the type of LAN. In the case of the Ethernet, "1" is entered. A protocol type field indicates the type of protocol, and "0x0800" indicates the IP. An HLEN field indicates the length of a physical hardware address, and a PLEN field indicates the length of the protocol address. An operation field indicates the type of the ARP packet such as of the ARP request, the ARP response and the like.

Figure 10:
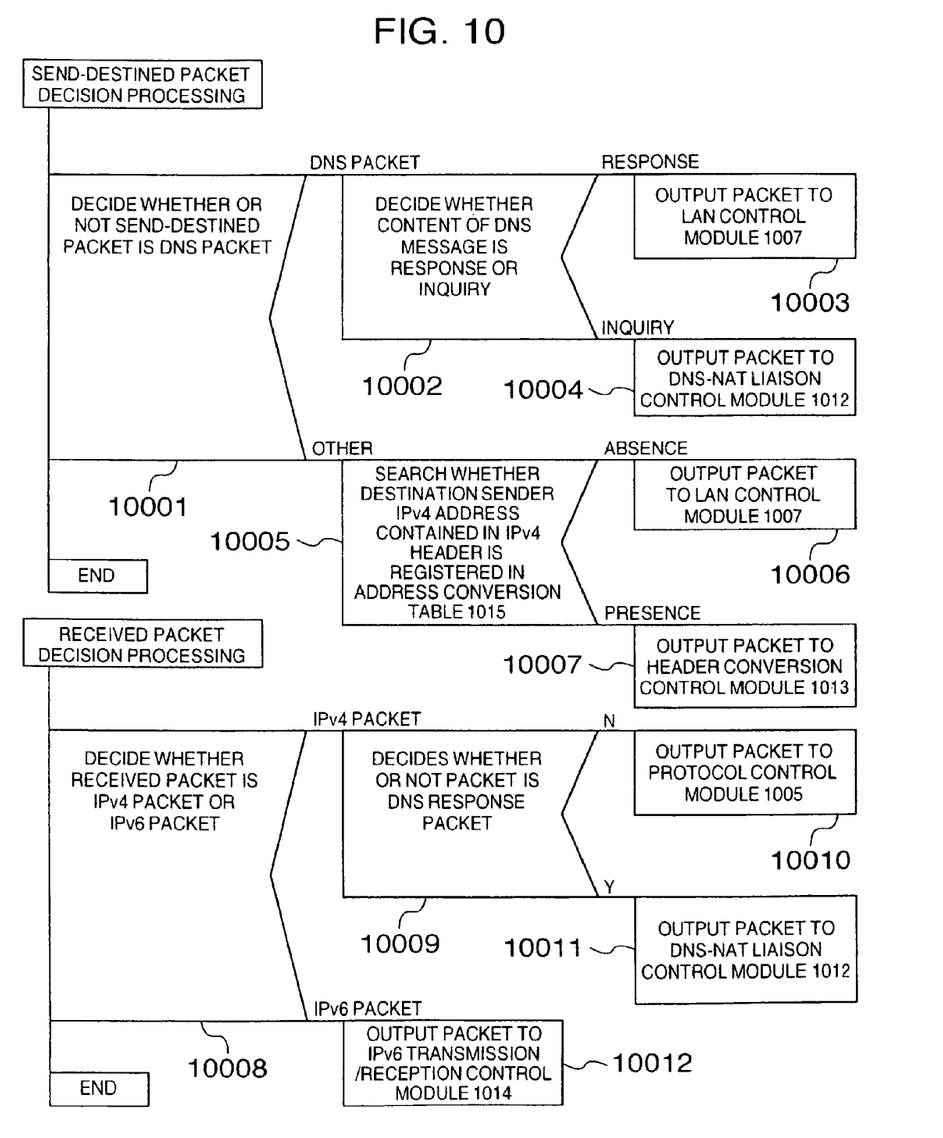
FIG. 10 illustrates a packet switch control processing flow in an IPv4-IPv6 switch control module.

Next, referring to FIG. 10, the packet switch control function of the IPv4-IPv6 switch control module 1010 will be explained. FIG. 10 shows a packet switch control processing flow of the IPv4-IPv6 switch control module 1010.

The IPv4-IPv6 switch control module 1010 makes the header conversion processing decision and the DNS packet decision for the IPv4 packet inputted from the protocol control module 1005. Further, the IPv4-IPv6 switch control module 1010 performs the header conversion processing decision for the IPv4 packet inputted from the LAN control module 1007.

Descriptions will first be directed to the processing for the packet inputted from the protocol control module 1005. Upon reception of the IPv4 packet from the protocol control module 1005, the IPv4-IPv6 switch control module 1010 first decides whether or not the IPv4 packet is a DNS packet (10001). In the case of the DNS packet, the IPv4-IPv6 switch control module 1010 interprets the messaged contents of the DNS header to thereby switch the control module to be called in dependence on the contents of the message (10002).

When the content of the message indicates the DNS packet, the IPv4-IPv6 switch control module 1010 outputs the IPv4 packet to the LAN control module 1007 as it is (10003). When the content of the message now concerned indicates the DNS inquiry packet, the IPv4-IPv6 switch control module 1010 outputs the IPv4 packet to the DNS-NAT cooperation control module 1012 (10004).

When the IPv4 packet inputted from the protocol control module 1005 is other than the DNS packet, the address translation table 1015 incorporated in the header conversion control module 1013 is searched for the send destination IPv4 address contained in the IPv4 header of the IPv4 packet inputted (10005). Unless the send destination IPv4 address contained in the IPv4 header coincides with the IPv4 address registered in the address translation table 1015, the IPv4-IPv6 switch control module 1010 outputs the IPv4 packet intactly to the LAN control module (10006). When coincidence is found, the IPv4-IPv6 switch control module 1010 outputs the IPv4 packet to the header conversion control module 1013 by way of the buffer conversion control module 1011 to perform the protocol conversion processing (10007).

Next, description will be made of the processing in the case where the IPv4-IPv6 switch control module 1010 receives as the input the IPv4 or IPv6 packet from the LAN control module 1007.

Upon inputting of the packet from the LAN control module 1007, the IPv4-IPv6 switch control module 1010 makes decision whether the packet as inputted is the IPv4 packet or the IPv6 packet (10008). In the case where the inputted packet is the IPv4 packet, the IPv4-IPv6 switch control module 1010 then decides whether or not the IPv4 packet is the DNS response packet (10009). Unless the IPv4 packet is the DNS response packet, the IPv4-IPv6 switch control module 1010 outputs the IPv4 packet to the protocol control module 1005 (10010). In case the inputted IPv4 packet is the DNS response packet, the IPv4-IPv6 switch control module 1010 outputs the IPv4 packet to the DNS-NAT cooperation control module (10011). When the packet inputted from the LAN control module 1007 is the IPv6 packet, the IPv4-IPv6 switch control module 1010 outputs the IPv6 packet to the IPv6 transmission/reception control module 1014 (10012).

Referring to FIG. 11 to FIG. 14, description will be made of the format of the DNS packet.

Figure 11:
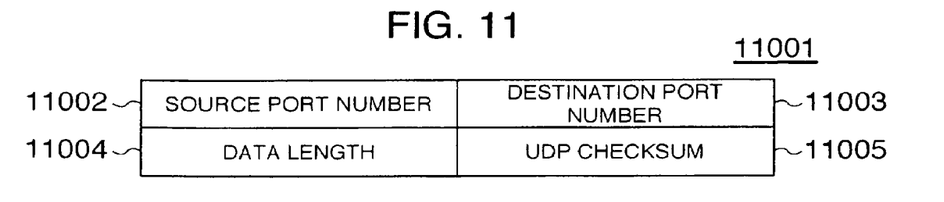
FIG. 11 is a view showing a format of a UDP header packet.
Figure 12:
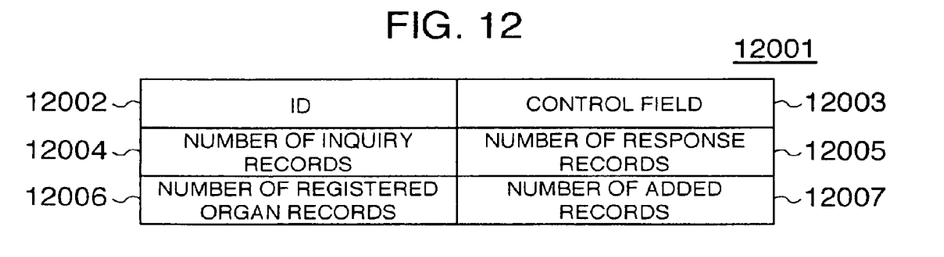
FIG. 12 is a view showing a format of a DNS header packet.

Ordinarily, for the DNS packet, UDP (User Datagram Protocol) is employed. A format of the UDP header is illustrated in FIG. 11. The UDP header is comprised of a source port number field, a destination port number field, a data length field and a UDP check-sum field. Ordinarily, "53" is used as the port number of the DNS. FIG. 12 shows a format of the DNS header. The DNS header is divided into an ID field, a control field, an inquiry record number field, a response record number field, a registered organ record number field and an additional record number field. In the ID field, a value generated arbitrarily upon generation of the inquiry packet is placed, and the ID contained in the DNS header of the response packet for the inquiry packet has the same value as the above-mentioned value. There are entered in the control field the packet information such as the types of the inquiry/response and the like.

Figure 13:
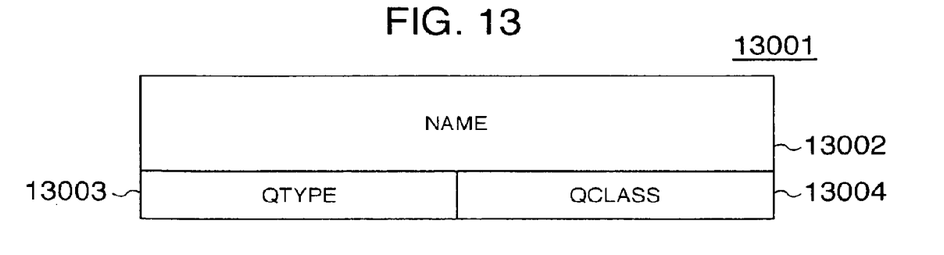
FIG. 13 is a view showing a format of a DNS inquiry message.

FIG. 13 shows a format of the DNS inquiry message. A domain name for the inquiry is set in a name field. In a QTYPE field, there is set inquiry type information such as the IPv4/IPv6 address or the like.

Figure 14:
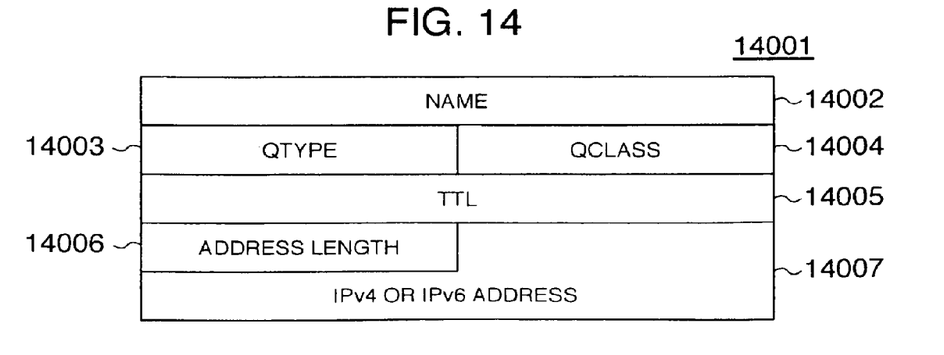
FIG. 14 is a view showing a format of a DNS response message.

FIG. 14 shows a format of the DNS response message. A domain name for the inquiry is set in a name field. In a QTYPE field, there is set inquiry type information such as the IPv4/IPv6 address or the like. In the IPv4 or IPv6 address field, an address corresponding to the address type designated in the QTYPE field is set.

Figure 8:
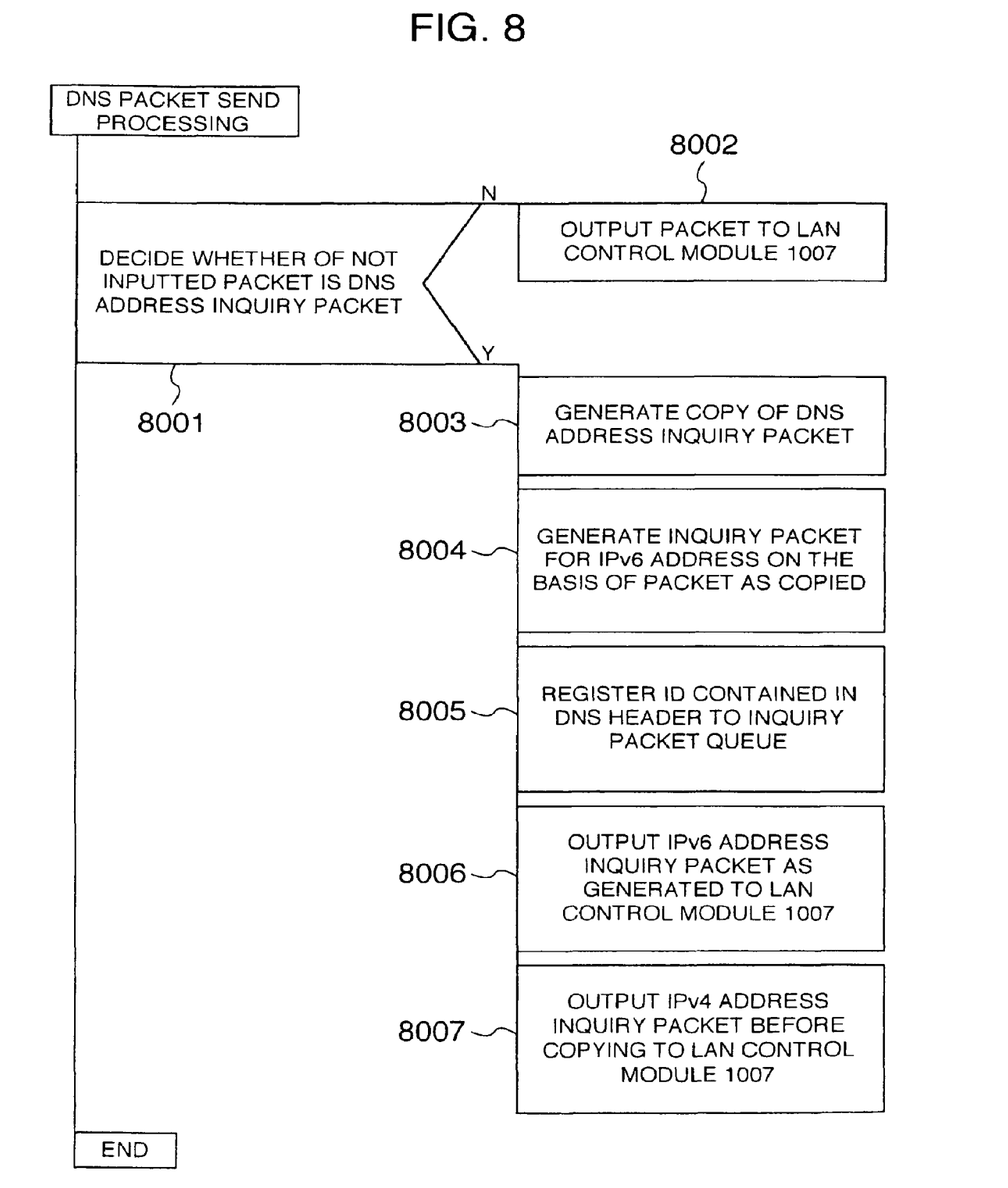
FIG. 8 illustrates a processing flow (DNS packet send processing) in a DNS-NAT cooperation control module.

Processing flow of the DNS-NAT cooperation control module 1012 will be explained by reference to FIGS. 8 and 9. The processing contents of the DNS-NAT cooperation control module 1012 can be globally classified to a processing for the DNS packet inputted from the protocol control module 1005 (which will be elucidated in conjunction with the DNS packet send processing shown in FIG. 8) and a processing of the DNS packet inputted from the LAN control module 1007 (which will be described in conjunction with the packet reception processing shown in FIG. 9).

At first, by reference to FIG. 8, description will be made of a processing flow in the case where the DNS-NAT cooperation control module 1012 receives as the input thereto a DNS address inquiry packet (IPv4 packet) from the IPv4-IPv6 switch control module 1010.

The DNS-NAT cooperation control module 1012 first checks the UDP header of the IPv4 packet as inputted to thereby decide whether the source port number is "53" and the type set in the DNS header is the DNS inquiry packet (8001). In the case where the type in the DNS header does not indicate the DNS address inquiry packet, the IPv4 packet is outputted intactly to the LAN control module (8002).

When the type set at the DNS header indicates the DNS address inquiry packet, the DNS-NAT cooperation control module 1012 then copies the DNS packet (8003) to thereby generate the DNS inquiry packet for the IPv6 address by using the copied packet (8004). Subsequently, the ID contained in the DNS header is registered in the inquiry packet queue (8005).

Finally, the DNS-NAT cooperation control module 1012 outputs the DNS inquiry packet of the IPv6 address to the LAN control module 1007 (8006), while the DNS inquiry packet of the IPv4 address is outputted to the LAN control module 1007 (8007).

Figure 9:
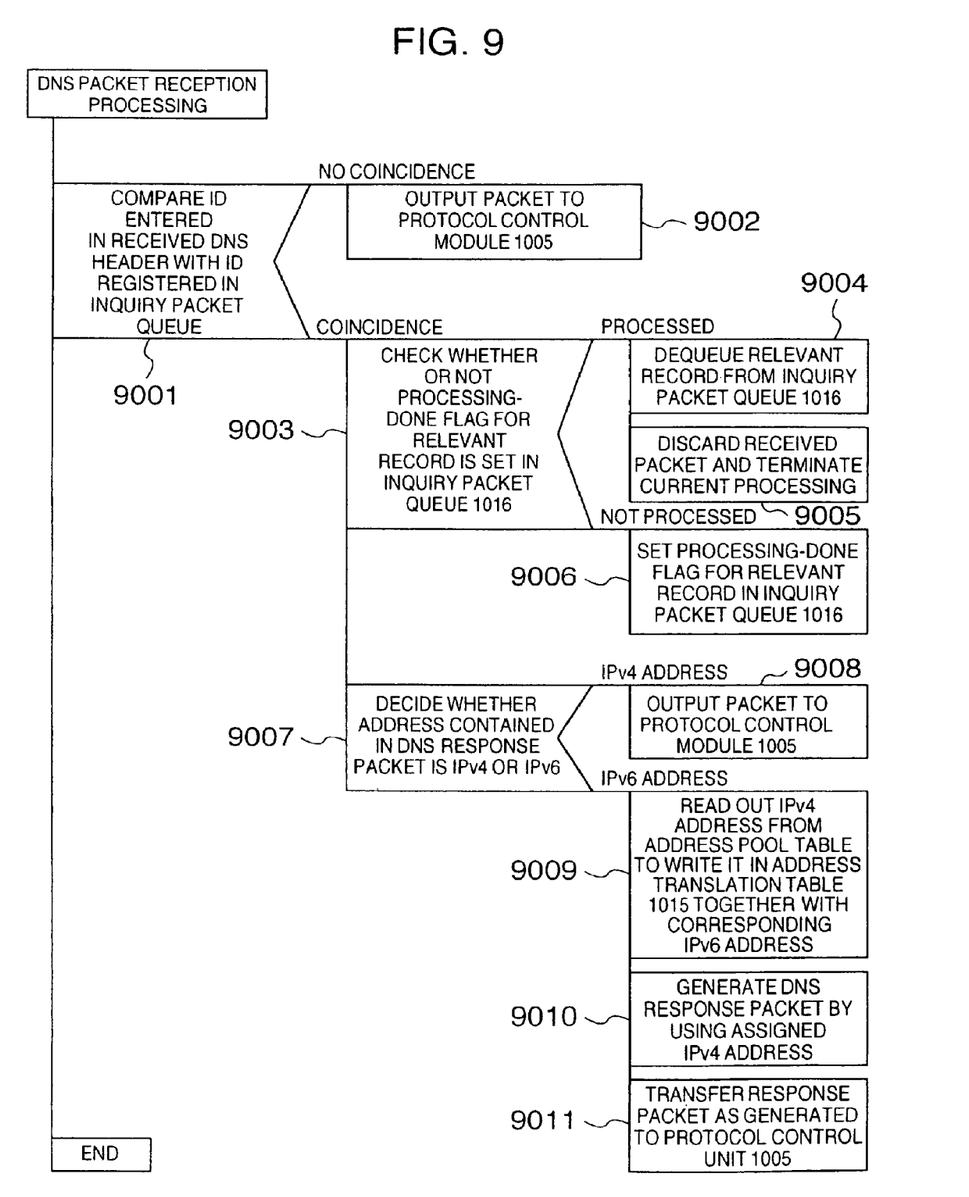
FIG. 9 illustrates a processing flow (DNS packet reception processing) in the DNS-NAT cooperation control module.

Next referring to FIG. 9, description will turn to a processing flow in the case where the DNS-NAT cooperation control module 1012 receives as the input a DNS response packet from the LAN control module 1007.

The DNS-NAT cooperation control module 1012 first compares the ID entered in the DNS header of the received packet with the ID registered in the inquiry packet queue to thereby check whether the ID of the DNS response packet coincides with any one of the identifiers registered in the inquiry packet queue 1016 (9001).

Unless the coincidence is found between the ID and the identifier, the DNS-NAT cooperation control module 1012 outputs the DNS response packet intactly to the protocol control module 1005 (9002). On the other hand, when the coincidence is found, the DNS-NAT cooperation control module 1012 then checks whether or not the response packet has already been at hand for the relevant packet of the DNS inquiry queue (9003). When the response packet has already been at hand, the relevant record is dequeued from the inquiry queue (9004), and the DNS response packet which is currently undergoing the reception processing is discarded (9005).

When the response packet has not been processed yet, the DNS-NAT cooperation control module 1012 sets a processing-done flag at the relevant record of the inquiry queue (9006). Then, the processing proceeds to the next step.

Next, the DNS-NAT cooperation control module 1012 makes decision as to the IP address contained in the response message (9007). When the IP address contained in the response message is the IPv4 address, the DNS packet is intactly transferred to the protocol control module (9008). When the IP address in the response message is the IPv6, a corresponding IPv4 address is read out from the address pool table to be registered in the address translation table (9009). In succession, the DNS response packet is generated by using the assigned IPv4 address (9010), whereon the DNS response packet as generated is outputted to the protocol control module 1005 (9011).

Next, description will turn to a second embodiment of the present invention.

Figure 5:
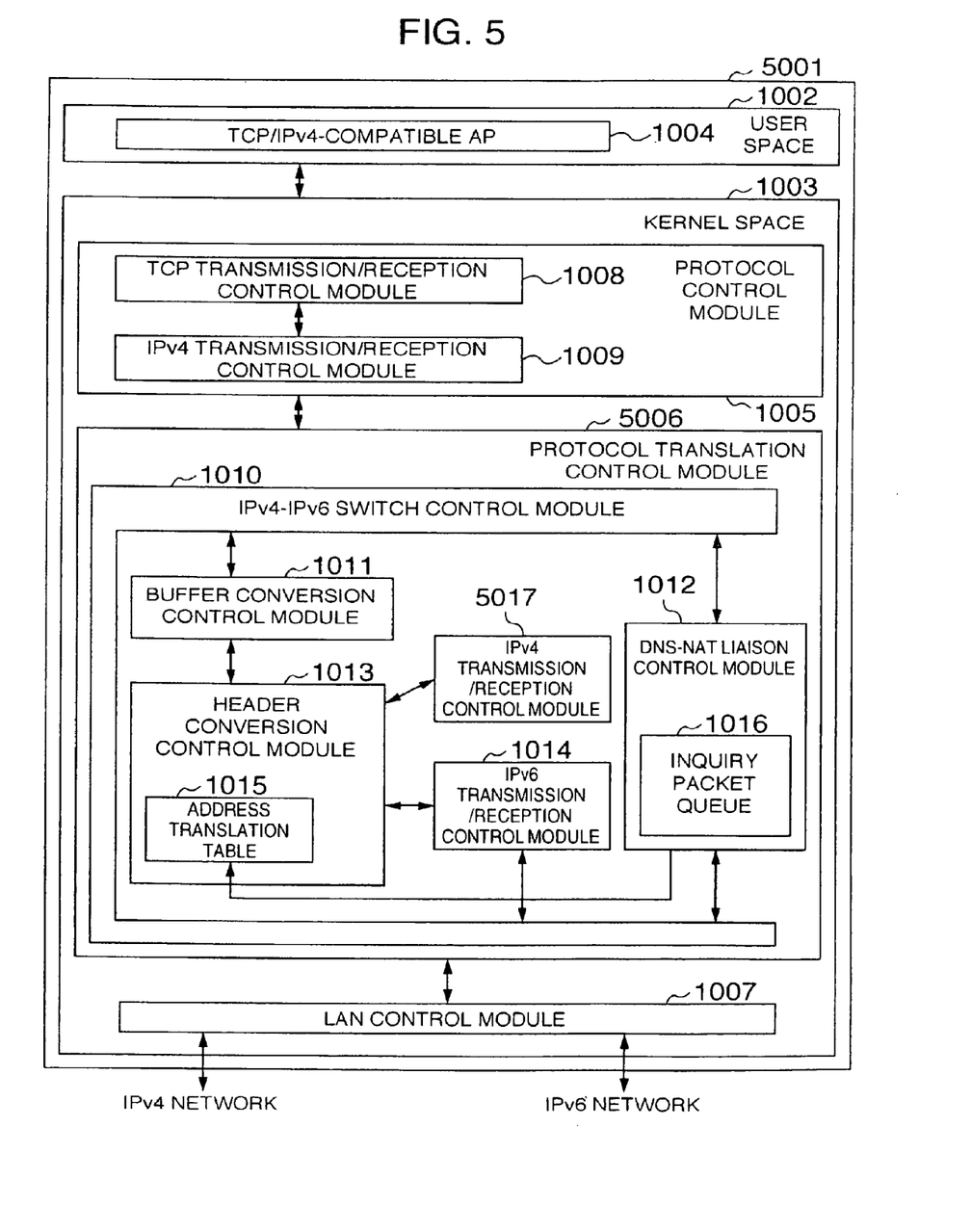
FIG. 5 is a configuration diagram of a LAN control apparatus according to a second embodiment of the present invention.

FIG. 5 shows a configuration of a LAN control apparatus 5001 according to the second embodiment of the invention. The address space of the LAN control apparatus 5001 is comprised of a user space 1002 in which application programs (AP) operate and a kernel space 1003 for a kernel to operate. A TCP/IPv4-compatible AP 1004 is resident in the user space 1002.

The kernel space 1003 includes a protocol control module 1005, a protocol conversion control module 5006 and a LAN control module 1007, respectively. The protocol control module 1005 is comprised of a TCP transmission/reception control module 1008 and an IPv4 control module 1009. The protocol control module 1005 transfers the data received from the TCP/IP-compatible AP 1004 to the protocol conversion control module 5006 as the IPv4 packet. The protocol conversion control module 5006 is comprised of an IPv4-IPv6 switch control module 1010, a buffer conversion control module 1011, a DNS-NAT cooperation control module 1012, a header conversion control module 1013, an IPv4 transmission/reception control module 5017 and an IPv6 transmission/reception control module 1014.

Next, description will be directed to the functions of the individual control modules.

The IPv4-IPv6 switch control module 1010 has a packet switch control function for the IPv4 packet transferred from the protocol control module 1005 and the received packet (IPv4 packet; IPv6 packet) transferred from the LAN control module 1007. The buffer conversion control module 1011 performs a buffer conversion control for the protocol control module 1005 and the protocol conversion control module 5006.

The IPv4 transmission/reception control module 5017 performs the IPv4 protocol processing. In other words, the IPv4 transmission/reception control module makes decision as to which one of plural protocols is now of concern and then performs the processing in accordance with the one protocol.

The IPv6 transmission/reception control module 1014 performs the IPv6 protocol processing. The header conversion control module 1013 performs the conversion between the IPv4 header and the IPv6 header by referencing the address translation table 1015. The DNS-NAT cooperation control module 1012 has reserved the address of the IPv4 (private address ordinarily) and allocates the IPv4 address as reserved to the IPv6 address of the connection-destined host, the allocated address being registered in the address translation control table 1015 incorporated in the header conversion control module 1013.

Next, description will be made of a third embodiment of the present invention.

Figure 6:
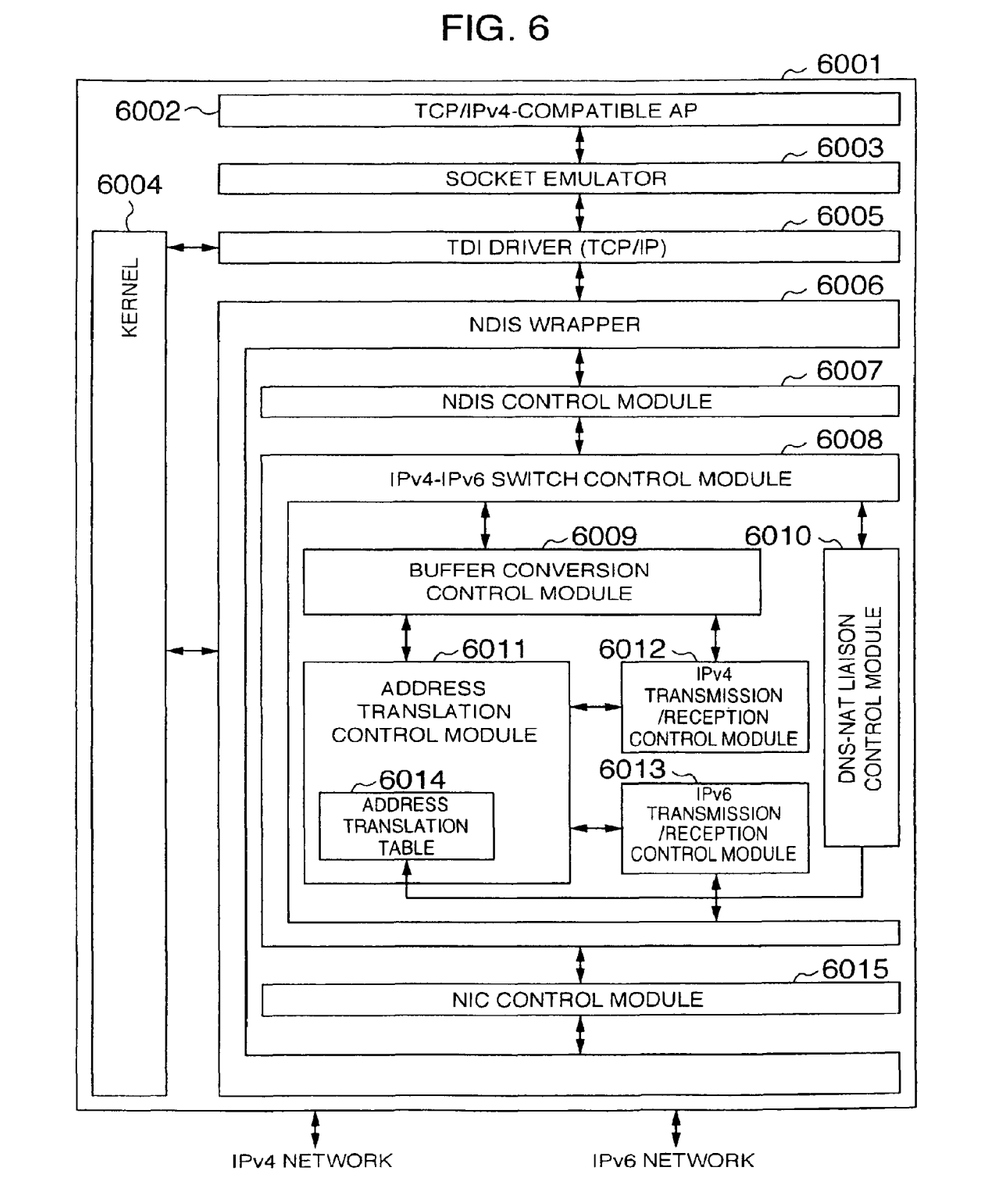
FIG. 6 is a configuration diagram of a LAN control apparatus according to a third embodiment of the present invention.

FIG. 6 shows a configuration of a LAN control apparatus 6001 according to the third embodiment. This LAN control apparatus 6001 is so implemented as to be employed generally in the PC or the like and includes a kernel 6004, a TCP/IPv4-compatible AP 6002, a socket emulator 6003, a transport driver (TCP/IP) 6005, an inter-kernel network interface control module (NDIS wrapper) 6006, a network interface control module (NDIS control module) 6007 and an NIC (Network Interface Card) control module 6015.

According to the instant embodiment, there are provided between the network interface control module 6007 and the NIC control module 6015 an IPv4-IPv6 switch control module 6008, a buffer conversion control module 6009, an address translation control module 6011, an IPv4 transmission/reception control module 6012, an IPv6 transmission/reception control module 6013 and a DNS-NAT cooperation control module 6010 in order to realize the IPv4-to-IPv6 header conversion function for thereby enabling the IPv4-compatible application to perform communication via the IPv6 network.

The IPv4-IPv6 switch control module 6008 performs a packet switch control for each of the IPv4 packet transferred from the network interface control module 6007 and the received packet (IPv4 packet or IPv6 packet) from the NIC control module 6015. The buffer conversion control module 6009 performs buffer conversion control between the buffer which is managed by the kernel 6004 and the buffer handled by the IPv4 transmission/reception control module 6012, the IPv6 transmission/reception control module 6013, the address translation control module 6011 and the DNS-NAT cooperation control module 6010.

The IPv4 transmission/reception control module 6012 performs IPv4 protocol processing. The IPv6 transmission/reception control module 6013 performs IPv6 protocol processing. The address translation control module 6014 performs the conversion of the IPv4 header and the IPv6 header by referencing the address translation table 6014. The DNS-NAT cooperation control module 6010 has reserved the address of the IPv4 (private address ordinarily) and allocates the IPv4 address as reserved to the IPv6 address of the connection-destined host, the allocated address being registered in the address translation control table 6014 incorporated in the address translation control module 6011.

In each of the embodiments described above, the protocol conversion control module is available as a program having additional functions, e.g. for the packet communication function of information processing apparatus in the form of a recording medium such as a floppy disk, a CD-ROM or the like or through delivery by way of a network or the like and can be installed in the information processing apparatus.

What is claimed:

1. A recording medium storing a packet communication program, said packet communication program causing an information processing apparatus connected to a network to communicate with another system through said network to execute steps, said information processing system comprising a packet control unit which generates a first packet corresponding to an IPv4, and a store unit which holds correspondence between addresses corresponding to said IPv4 and addresses corresponding to an IPv6 allocated to said another system, said execution steps comprising:

searching by a protocol conversion unit of said information processing unit, whether an IPv6 address corresponding to IPv4 contained as a destination address in the IP4 packet generated by said packet control unit is held in said store unit; and converting by said protocol conversion unit, the IP4 packet generated by said packet control unit to an IPv6 packet containing the IPv6 address held in said store unit as a destination address when the IPv6 address is held in said store unit.

2. A recording medium according to claim 1, wherein said packet communication program further comprises a step of sending by a network control unit of said information processing system, said IPv4 packet or said IPv6 packet to the network.

3. A recording medium according to claim 2, wherein when said searching step determines that the store unit does not store the IPv6 address, said sending step causes the network control unit of said information processing system to send said IPv4 packet to the network.

4. A recording medium according to claim 1, wherein said packet communication program further comprises a step of receiving by a network control unit of said information processing system, a second IPv4 packet or a second IPv6 packet.

5. A recording medium according to claim 4, wherein said packet communication program further comprises a step of converting by said protocol conversion unit, said second IPv6 packet to a third IPv4 packet corresponding to said second IPv6 packet when said network control unit receives the second IPv6 packet in said receiving step.

6. A recording medium storing a packet communication program, said packet communication program causing an information processing system connected to a network for communicating with another system through said network to execute steps, said information processing system comprising an application execution unit which executes an application program corresponding to an IPv4, a packet control unit which generates a packet corresponding to said IPv4 from data generated by said application execution unit, and a store unit which holds correspondence between addresses and corresponding to said IPv4 and addresses corresponding to said IPv6, allocated to said another system, said execution steps comprising:
searching by a protocol conversion unit of said information processing system, whether an IPv6 address correlated with an Ipv4 address contained as a destination address in said IPv4 packet generated by said packet control units held in said store unit; and converting by said protocol conversion unit, the IPv4 packet generated by the packet control unit to the IPv6 packet containing the IPv6 address as a destination address held in said store unit when the IPv6 address is held in said store unit.

7. A recording medium according to claim 6, wherein said packet communication program further comprises a step of sending y b a network control unit of said information processing system, said IPv4 packet or said IPv6 packet to the network.

8. A recording medium according to claim 7, wherein when said searching step determines that the store unit does not store the IPv6 address, said sending step causes the network control unit of said information processing system, a second IPv4 packet or a second IPv6 packet.

9. A recording medium according to claim 6, wherein said packet communication program further comprises a step of receiving by a network control unit of said information processing system, a second IPv4 packet or a second IPv6 packet.

10. A recording medium according to claim 9, wherein said packet communication program further comprises a step of converting by said protocol conversion unit, said second IPv6 packet to a third IPv4 packet corresponding to said second IPv6 packet when said network control unit receives the second IPv6 packet in said receiving step.

* * * * *